(12) United States Patent
Frankel et al.

(10) Patent No.: US 11,530,147 B2
(45) Date of Patent: Dec. 20, 2022

(54) BIOFILM CARRIERS FOR USE IN WASTEWATER TREATMENT

(71) Applicants: Thomas E. Frankel, Poughkeepsie, NY (US); Seoungil Kang, Poughkeepsie, NY (US); Todd D. Ritter, Poughkeepsie, NY (US)

(72) Inventors: Thomas E. Frankel, Poughkeepsie, NY (US); Seoungil Kang, Poughkeepsie, NY (US); Todd D. Ritter, Poughkeepsie, NY (US); Benjamin Kang, Poughkeepsie, NY (US); Robert G. Freudenberg, Hillsborough, NC (US); Kelsey A. Bennett, Denver, CO (US)

(*) Notice: Subject to any disclaimer, the term of this patent is extended or adjusted under 35 U.S.C. 154(b) by 21 days.

(21) Appl. No.: 16/946,490

(22) Filed: Jun. 24, 2020

(65) Prior Publication Data

US 2021/0403352 A1    Dec. 30, 2021

(51) Int. Cl.
| | |
|---|---|
| C02F 3/10 | (2006.01) |
| B29C 48/11 | (2019.01) |
| B29C 48/12 | (2019.01) |
| B29C 48/00 | (2019.01) |
| B29C 48/88 | (2019.01) |
| B29K 105/04 | (2006.01) |

(Continued)

(52) U.S. Cl.
CPC .......... *C02F 3/109* (2013.01); *B29C 48/0012* (2019.02); *B29C 48/11* (2019.02); *B29C 48/12* (2019.02); *B29C 48/919* (2019.02); *B29C 48/9115* (2019.02); *C02F 3/106* (2013.01);

*C02F 3/107* (2013.01); *B29K 2023/065* (2013.01); *B29K 2105/04* (2013.01); *B29L 2031/608* (2013.01); *C02F 3/08* (2013.01)

(58) Field of Classification Search
CPC ..... B29C 48/0012; B29C 48/11; B29C 48/12; B29C 48/9115; B29C 48/919; B29C 48/022; C02F 3/109; C02F 3/106; C02F 3/107; C02F 3/08; C02F 3/108; C02F 3/085; B29K 2023/065; B29K 2105/04; B29L 2031/608; Y02W 10/10
See application file for complete search history.

(56) References Cited

U.S. PATENT DOCUMENTS 5,055,186 A * 10/1991 Van Toever ............ C02F 3/085
                                                                210/150
5,458,779 A * 10/1995 Odegaard ............. C02F 3/2806
                                                                210/150

(Continued)

FOREIGN PATENT DOCUMENTS

WO          WO9610542        *   4/1996

*Primary Examiner* — Jeffrey M Wollschlager
(74) *Attorney, Agent, or Firm* — Law Offices Of Michael L. Wise, LLC

(57) ABSTRACT

A process for forming a biofilm carrier suitable for use in a moving bed biofilm reactor (MBBR) is presented. A blowing agent is mixed with a plastic material to form a blended material. The blended material is then heated to a temperature where the blowing agent liberates gas by decomposition. The heated blended material is extruded through a die to provide the extrudate with a profile of the biofilm carrier. Advantageously, biofilm carriers produced in this manner have increased effectiveness when compared to conventional biofilm carriers.

8 Claims, 7 Drawing Sheets

(51) Int. Cl.
*C02F 3/08* (2006.01)
*B29K 23/00* (2006.01)
*B29L 31/60* (2006.01)

(56) References Cited

U.S. PATENT DOCUMENTS

| | | | | |
|---|---|---|---|---|
| 5,543,039 | A | * | 8/1996 | Odegaard .................. C02F 3/10 261/95 |
| 5,962,309 | A | * | 10/1999 | Kumagai .................. C02F 3/10 435/299.1 |
| 5,980,738 | A | * | 11/1999 | Heitkamp ............ C12N 11/096 210/150 |
| 2003/0127378 | A1 | * | 7/2003 | Shechter ................. C02F 3/223 210/150 |
| 2007/0102354 | A1 | * | 5/2007 | Flournoy .................. C02F 3/06 210/616 |
| 2007/0284294 | A1 | * | 12/2007 | Jackson .................... C02F 3/10 210/150 |
| 2009/0124717 | A1 | * | 5/2009 | Uehara ............... B29C 44/3461 521/55 |
| 2013/0020266 | A1 | * | 1/2013 | Timmons ............. A01K 63/045 210/786 |
| 2013/0233793 | A1 | * | 9/2013 | Tokutomi .............. C02F 3/2833 210/615 |
| 2016/0376175 | A1 | * | 12/2016 | Welander ................ C02F 3/109 435/299.1 |
| 2019/0010069 | A1 | * | 1/2019 | Skardon .................. C02F 3/341 |
| 2020/0062627 | A1 | * | 2/2020 | Cord-Ruwisch ........ C02F 3/341 |
| 2020/0369544 | A1 | * | 11/2020 | Sauvignet ................ C02F 3/08 |
| 2021/0163328 | A1 | * | 6/2021 | Larson ...................... C02F 9/00 |

* cited by examiner

BIOFILM CARRIERS FOR USE IN WASTEWATER TREATMENT

BACKGROUND OF THE INVENTION

Moving bed biofilm reactors (MBBRs) employ thousands of small biofilm carriers (sometimes called "MBBR media") in an aerated wastewater treatment tank. These biofilm carriers are mixed by bubbles evolved from diffusers positioned at the bottom of the tank. The rapidly circulating biofilm carriers provide an ideal substrate for high-density populations of useful bacteria. These high-density populations support high-rate biodegradation within the system. MBBR systems may only be a fraction of the size of conventional systems and are easily expandable.

FIG. 1 shows a perspective view of a conventional biofilm carrier 100 in a wastewater treatment tank 105. In the figure, useful bacterial 110 are adhered to one half of the biofilm carrier 100 and the remainder of the biofilm carrier 100 is left clean to show its underlying structure. The useful bacteria 110 tend to form on protected surfaces of the biofilm carrier 100. Outward-facing surfaces that rub against other biofilm carriers are largely bare.

A lot of research and development has gone into the design of biofilm carriers. Ideal biofilm carriers are wear resistant and are also chemically resistant to the products found in a wastewater treatment tank. They are also tolerant of the temperature fluctuations found in wastewater treatment systems; have a density (i.e., specific gravity) that allows them to be easily mixed by an aeration system in a wastewater tank without floating or sinking; have a surface conducive to the growth and adherence of bacterial colonies; and have a high surface-area-to-volume ratio (SA:V) without having small channels or passages that can be easily clogged by bacterial colonies, accumulated sludge, and other matter. Being inexpensive to mass produce is also a favorable characteristic. Even small changes in biofilm carrier effectiveness can greatly affect the organic pollution removal efficiency of an MBBR system.

For the foregoing reasons, there is a need for alternative MBBR biofilm carrier designs with increased effectiveness, as well as processes for making these improved carriers.

SUMMARY OF THE INVENTION

Embodiments of the present invention address the above-identified need by providing methods of producing enhanced biofilm carriers having increased effectiveness when compared to conventional biofilm carriers.

Aspects of the invention are directed to a process for forming a biofilm carrier. A blowing agent is mixed with a plastic material to form a blended material. The blended material is then heated to a temperature where the blowing agent liberates gas by decomposition. The heated blended material is extruded through a die to provide the extrudate with a profile of the biofilm carrier.

Additional aspects of the invention are directed to another process for forming a biofilm carrier. A soluble filler is mixed with a plastic material to form a blended material. The blended material is then extruded through a die to provide an extrudate with a profile of the biofilm carrier. The extrudate is passed through a tank comprising a solvent to dissolve away the soluble filler.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein, a "solvent" comprises a liquid that can dissolve a solute and includes, but is not limited to, water where the solute is soluble in water.

Aspects of the invention are directed to biofilm carriers with increased effectiveness, and methods for forming such improved biofilm carriers. In one or more embodiments, the improved biofilm carriers are produced by an extrusion process. Before extrusion, a blowing agent is introduced into the plastic. This blowing agent decomposes to liberate gas during the extrusion process. The decomposition in combination with the extrusion process creates depressions in the surfaces of the extruded biofilm carriers, while also creating perforations in the sidewalls of the biofilm carriers. These surface features increase the ultimate effectiveness of the biofilm carriers when utilized in an MBBR process.

Figure 1:
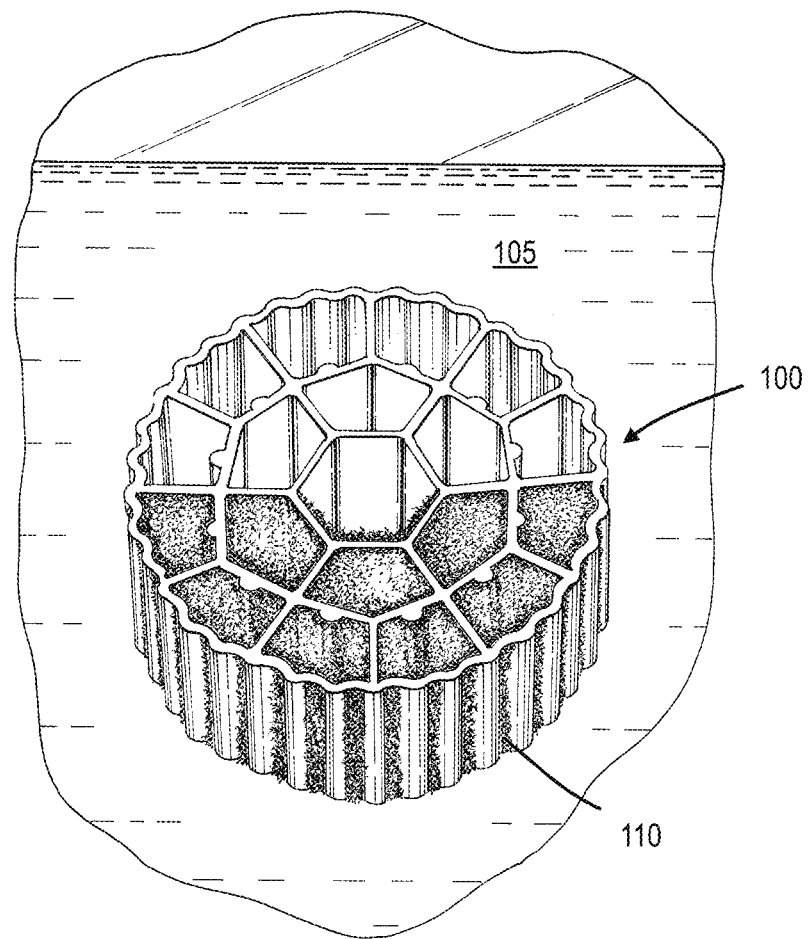
FIG. 1 shows a perspective view of a conventional biofilm carrier with useful bacteria attached to one half of the biofilm carrier.
Figure 2:
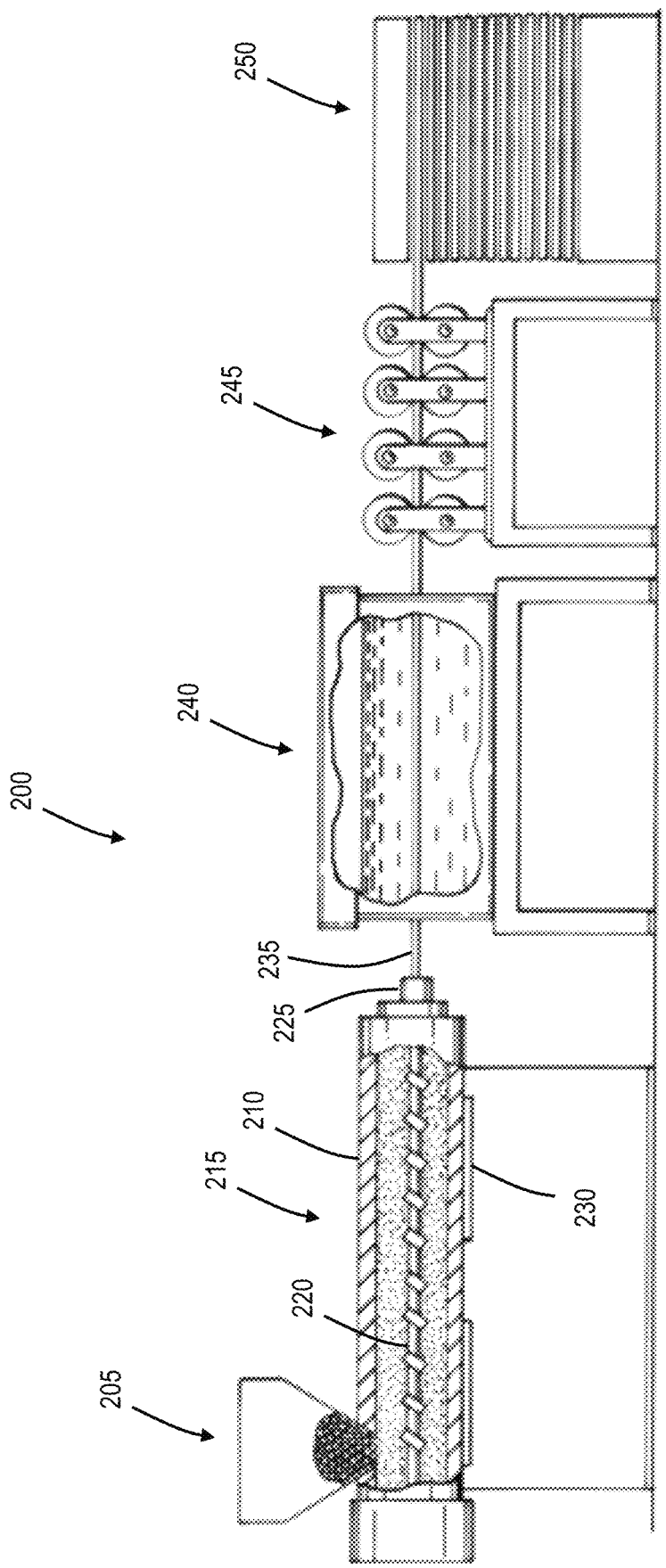
FIG. 2 shows a pictorial representation of an extrusion system suitable for use in implementing aspects of the invention.

A pictorial representation of an extrusion system 200 suitable for use in performing aspects of the invention is shown in FIG. 2. During extrusion, plastic material is fed from a hopper 205 into a barrel 210 of an extruder 215. There, the plastic material is gradually melted by the mechanical energy generated by a rotating screw 220 that drives the plastic forward towards a die 225, as well as by heater bands 230 that surround the barrel 210 of the extruder 215. The molten plastic is then forced through the die 225, which shapes the plastic (now the extrudate 235) into a desired shape, which becomes fixed as the plastic is cooled in a water tank 240. A pull roller 245 pulls the extrudate 235 from the die 225 through the water tank 240 and allows the cooled extrudate 235 to collect on a wind-up machine 250. At this point the extrudate 235 has the profile of the desired biofilm carrier. The extrudate 235 is later cut into individual biofilm carriers.

Manufacturing plastic parts by extrusion will already be familiar to one having ordinary skill in the relevant manufacturing arts. In addition, aspects of plastic extrusion are also reviewed in H. F. Giles et al., *Extrusion: The Definitive Processing Guide and Handbook*, William Andrews, 2004, which is hereby incorporated by reference herein.

A chemical blowing agent may produce a cellular structure in a molten plastic by decomposing in response to heating and emitting a blowing gas. That is, when heated, the blowing agent evolves a gas by decomposition that creates pockets of gas in the plastic to produce what may be called a foam. In accordance with aspects of the invention, the blowing agent may be introduced into the plastic in hopper 205 of extrusion system 200. In one or more embodiments, for example, the plastic in the hopper 205 may be in the form of a powder. The blowing agent may also be a powder, facilitating even mixing of the plastic and the blowing agent.

The mixture of the plastic and the blowing agent (the "blended material") is then sent through the extrusion process. As indicated earlier, both the mechanical turning of the rotating screw 220 and the heater bands 230 heat the blended material to a temperature that causes the plastic to soften as well as the blowing agent to thermally decompose, producing pockets of gas in the molten plastic. As the molten plastic passes through the die 225 and the cooling elements of the extrusion system 200, the gas pockets are ruptured, leaving depressions in the surface of the just-produced biofilm carriers (i.e., surface depressions), as well as perforations in their sidewalls (i.e., sidewall perforations). These characteristics enhance the surfaces of the biofilm carriers, making these surfaces more conducive to the growth of high-density populations of useful bacteria. They also enhance the adherence of bacterial colonies to the biofilm carriers. The perforations also improve the supply of nutrients to the bacterial colonies, further enhancing their health and rate of growth. In these many ways, the effectiveness of the biofilm carriers is enhanced.

Figure 3:
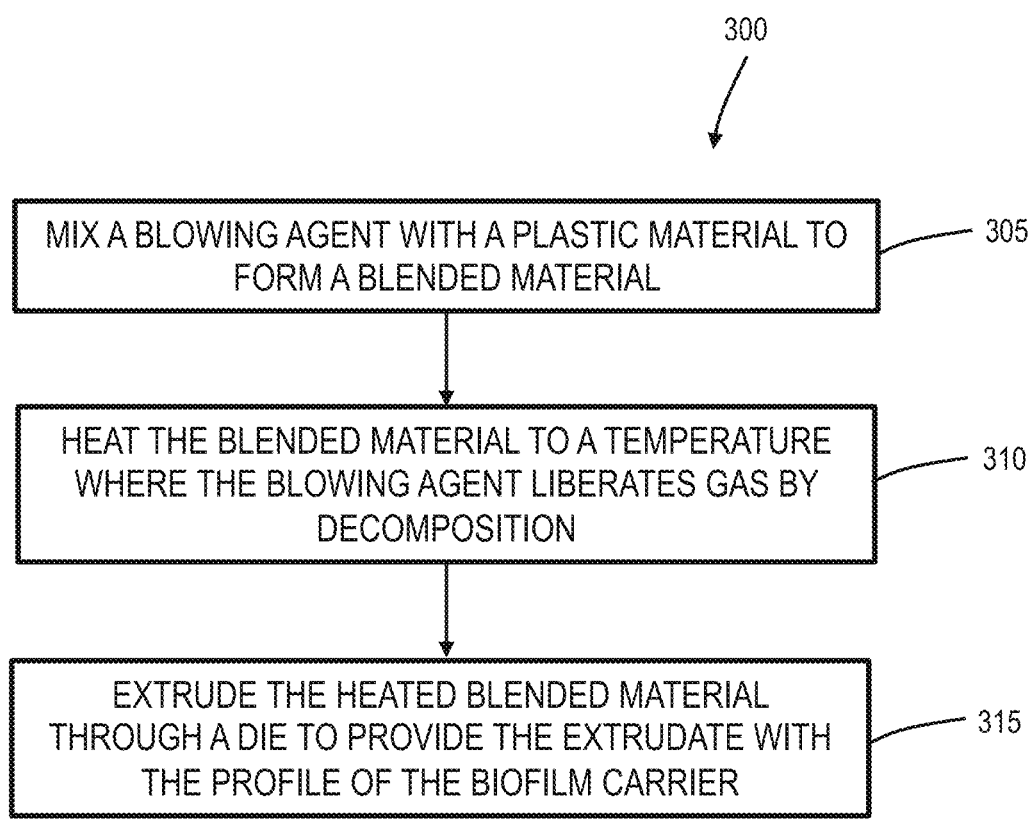
FIG. 3 shows a flow chart of a process in accordance with an illustrative embodiment of the invention.

A flow chart of the just-described process for forming a biofilm carrier is shown in FIG. 3. In a process 300, a blowing agent is mixed with a plastic material at step 305 to form a blended material. Subsequently, at step 310, the blended material is heated to a temperature where the blowing agent liberates gas by decomposition and creates pockets of gas in the plastic material. Lastly, at step 315, the blended material is extruded through a die that provides the extrudate with the desired profile of the biofilm carrier.

In one or more non-limiting, illustrative embodiments, the plastic may comprise high-density polyethylene (HDPE), which has a density similar to that of water. HDPE is typically extruded at a temperature between about 180 and about 205 degrees Centigrade (° C.). The blowing agent may comprise azodicarbonamide (ADCA). ADCA evolves gas at temperatures above about 150° C. A suitable temperature for extruding a blend of HDPE and ADCA is therefore between about 180° C. and about 205° C. Between one gram and ten grams of ADCA may be used for every kilogram of HDPE. A gram of ADCA is estimated to liberate about 35 to 45 milliliters of gas under relevant processing conditions. In an experimental run, for example, a ratio of 2.4 grams of ADCA per kilogram of HDPE was utilized with good results. This translates to the use of about 2.4 milligrams of ADCA per biofilm carrier if it is assumed that a biofilm carrier weighs about one gram.

Figure 4:
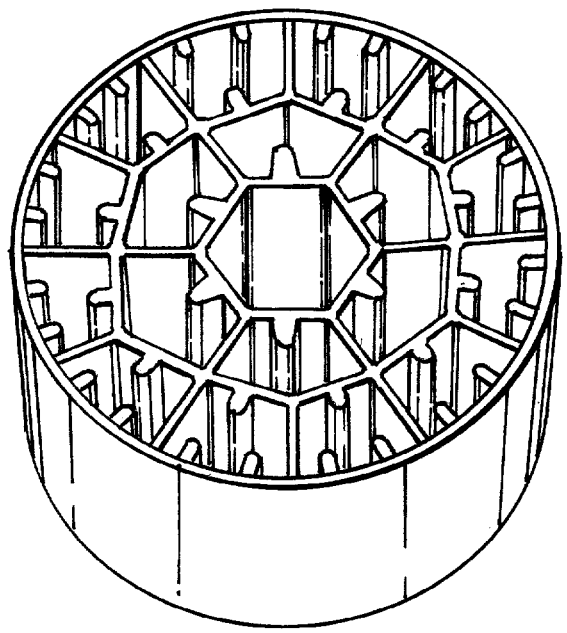
FIG. 4 shows a perspective view of a conventional biofilm carrier formed by conventional means.
Figure 5:
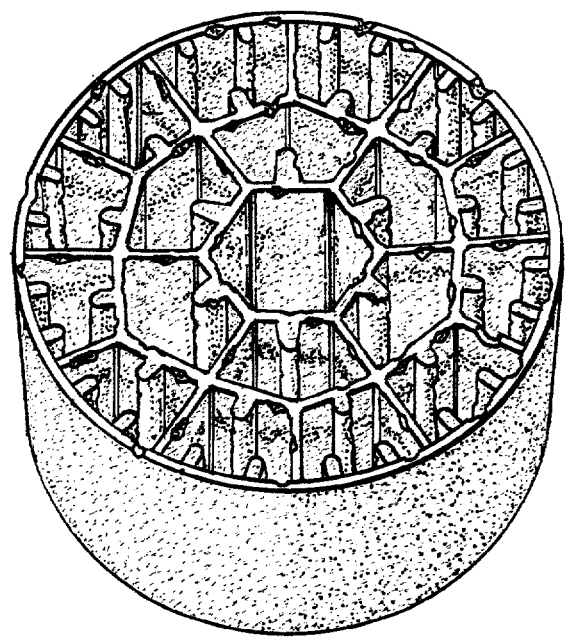
FIG. 5 shows a perspective view of an enhanced biofilm carrier formed using aspects of the invention.
Figure 6:
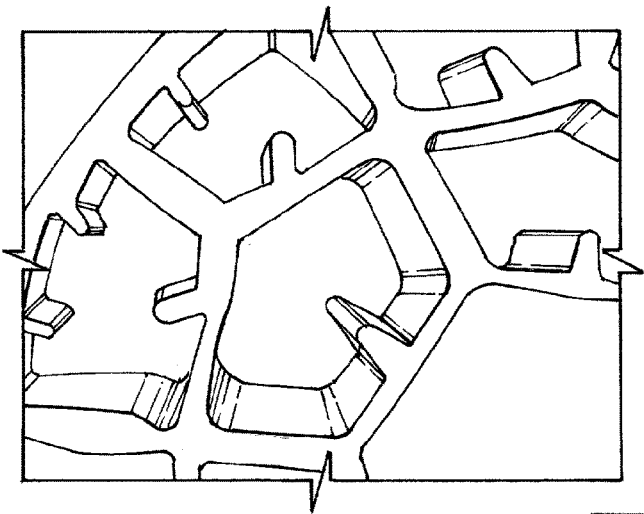
FIG. 6 shows a magnified front view of a conventional biofilm carrier.
Figure 7:
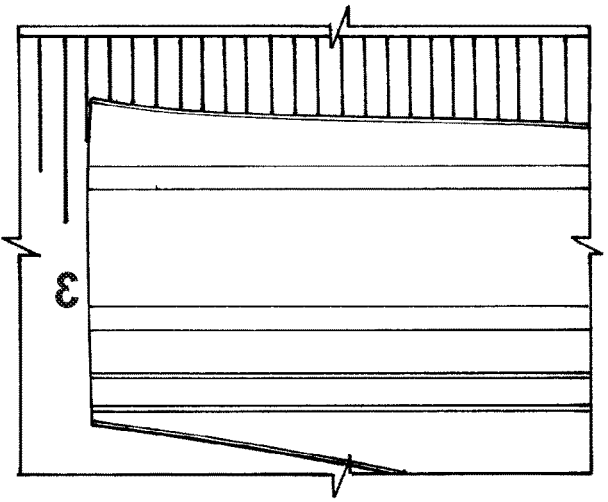
FIGS. 7 and 8 show exterior and interior views, respectively, of a sectioned conventional biofilm carrier.
Figure 8:
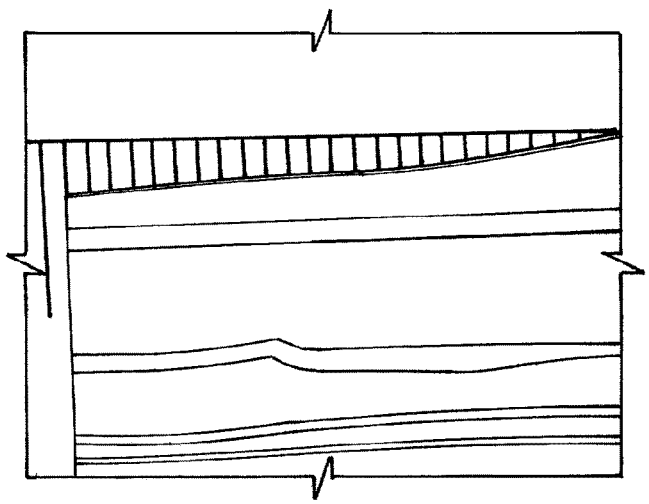
Figure 9:
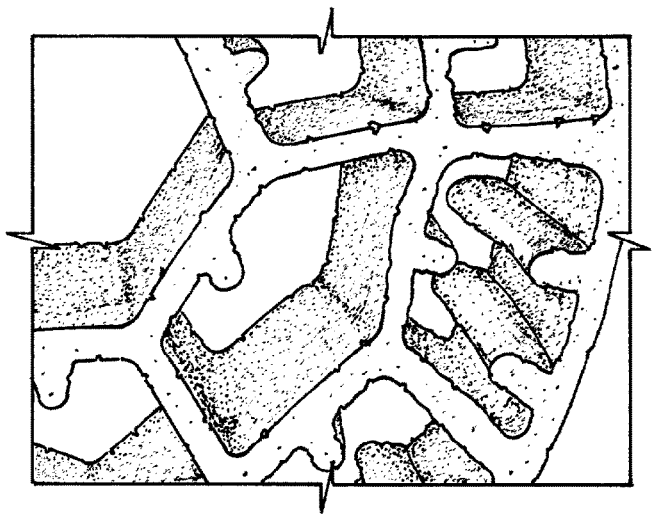
FIG. 9 shows a magnified front view of an enhanced biofilm carrier.
Figure 10:
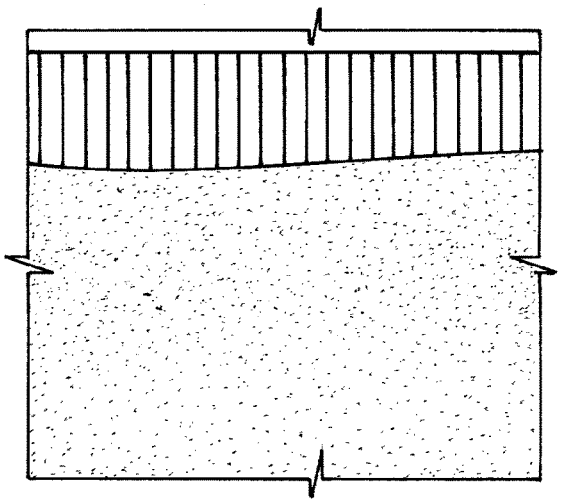
FIGS. 10 and 11 show exterior and interior views, respectively, of a sectioned enhanced biofilm carrier.
Figure 11:
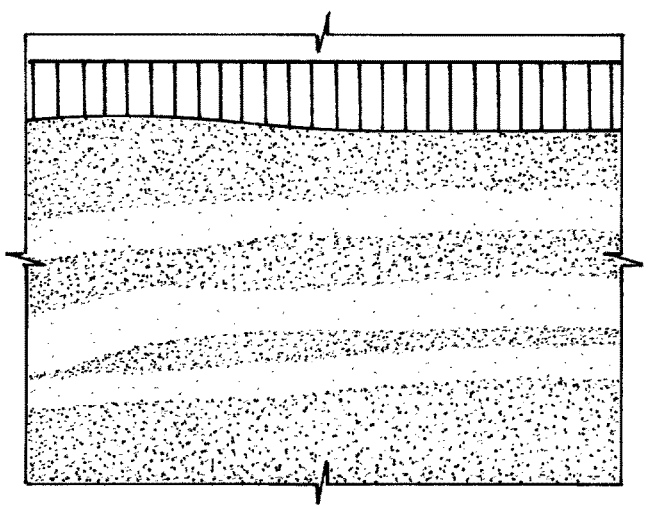

Differences in HDPE biofilm carriers produced by conventional means (hereinafter "conventional biofilm carriers") and those produced by the addition of ADCA to HDPE (hereinafter "enhanced biofilm carriers") are shown in in FIGS. 4-11, which are based on actual photographs. FIG. 4 shows a perspective view of a conventional biofilm carrier, while FIG. 5 shows a perspective view of an enhanced biofilm carrier. FIG. 6 shows a magnified front view of a conventional biofilm carrier, while FIGS. 7 and 8 show exterior and interior views, respectively, of a sectioned conventional biofilm carrier. Finally, FIG. 9 shows a magnified front view of an enhanced biofilm carrier, while FIGS. 10 and 11 show exterior and interior views, respectively, of a sectioned enhanced biofilm carrier. The surfaces of the conventional biofilm carriers (FIGS. 4 and 6-8) are relatively smooth, largely translucent, and mostly uniform. In contrast, the surfaces of the enhanced biofilm carriers (FIGS. 5 and 9-11) are noticeably uneven and roughened. That is, both surface depressions and sidewall perforations of the type that enhance biofilm carrier effectiveness are clearly evident in the enhanced biofilm carriers (FIGS. 5 and 9-11).

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art. Aspects of the invention would include the process of manufacturing and using the above-described biofilm carriers; the biofilm carriers themselves; and systems that include the biofilm carriers.

For example, while ADCA is specified by name above, there are many suitable blowing agents for use in performing aspects of the invention, and any one of these alternative materials would fall within the scope of the invention. These alternative blowing agents include, but are not limited to, isocyanates, hydrazine and other nitrogen-based materials, and sodium bicarbonate.

Figure 12:
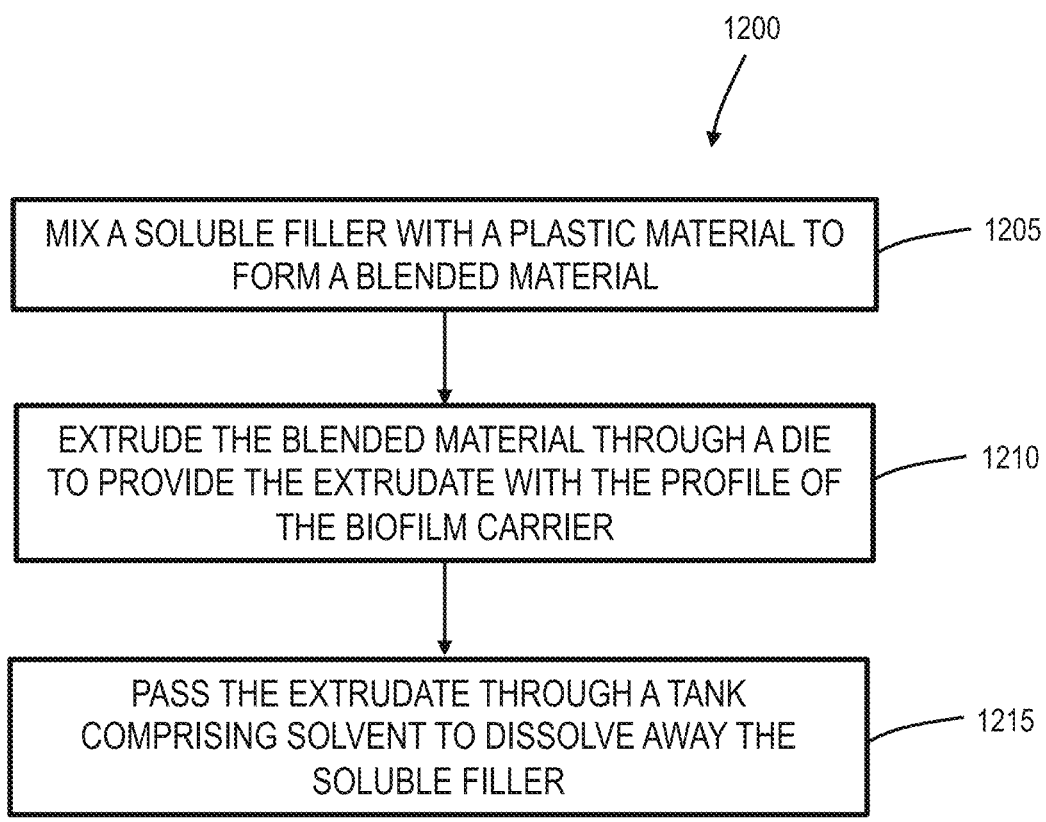
FIG. 12 shows a flow chart of a process in accordance with an alternative illustrative embodiment of the invention.

Moreover, in alternative embodiments of the invention, a soluble filler rather than a gas-evolving blowing agent may be added to the plastic in a hopper prior to extrusion. FIG. 12 shows a flow chart of an alternative process 1200 for forming a biofilm carrier using such an alternative method. Advantageously, in many circumstances, an extrusion system like the extrusion system 200 in FIG. 2 may be used to implement the alternative process 1200.

In step 1205 of the alternative process 1200, a soluble filler is mixed with a plastic material to form a blended material. Such mixing may occur in the hopper 205. Next in step 1210, the blended material is extruded through the die 225 to provide the extrudate 235 with the profile of the biofilm carrier. After extrusion, in step 1215, the extrudate 235 passes through a tank comprising a solvent to dissolve away the soluble filler. If the soluble filler is soluble in water, then the dissolving of the soluble filler may occur in the water tank 240 where the cooling water itself acts as the solvent. That is, under these circumstances, cooling the extrudate 235 and the dissolving of the soluble filler both occur at the same time in the water tank 240.

In one or more embodiments, for example, the soluble filler may be a water-soluble salt such as sodium chloride. Being a solid material, the sodium chloride is easily mixed with powdered HDPE (i.e., another solid material) in the hopper 205 of the extrusion system 200. Alternative water-soluble fillers include saccharides such as sugars. In even other embodiments, the soluble filler may be a solvent-extractable agent that requires a solvent other than water for its removal. In the latter case, the extrudate 235 may be made to pass through a purpose-specific solvation tank in addition to the water tank 240 with the purpose-specific solvation tank containing an appropriate solvent in addition to or other than water.

In either case, inclusion of the soluble filler during extrusion, and removal of the soluble filler after extrusion, imparts the plastic biofilm carrier with pockets that are ultimately ruptured to form surface depressions and sidewall perforations in the biofilm carrier. Both physical characteristics aid in the effectiveness of the biofilm carrier when incorporated into an MBBR process.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. § 112(f). In particular, the use of "steps of" in the claims herein is not intended to invoke the provisions of AIA 35 U.S.C. § 112(f).

What is claimed is:

1. A process for forming a biofilm carrier, the process comprising the steps of:
    mixing a blowing agent with a plastic material to form a blended material;
    heating the blended material to a temperature where the blowing agent liberates gas by decomposition; and
    extruding the heated blended material through a die to provide the extrudate with a profile of the biofilm carrier;
    wherein the biofilm carrier is characterized by a tubular frame surrounding a predefined pattern of sidewall features and empty spaces, and the biofilm carrier does not sink when immersed in undisturbed water;
    wherein the biofilm carrier is characterized by sidewall perforations forming through holes in the sidewall features.

2. The process of claim 1, wherein the blowing agent creates pockets of gas in the plastic material.

3. The process of claim 1, wherein the blowing agent comprises azodicarbonamide, isocyanate, hydrazine, or sodium bicarbonate.

4. The process of claim 1, wherein the plastic material comprises high-density polyethylene.

5. The process of claim 1, wherein the mixing step comprises mixing two solid materials.

6. The process of claim 1, further comprising the step of cooling the extrudate.

7. The process of claim 6, wherein the cooling occurs in a tank of water.

8. The process of claim 1, wherein the biofilm carrier is characterized by surface depressions.

* * * * *